United States Patent [19]

Kita

[11] 4,320,650

[45] Mar. 23, 1982

[54] FLOW RATE MEASURING APPARATUS HAVING VORTEX-GENERATING ELEMENT AND HOT WIRE ELEMENT

[75] Inventor: Toru Kita, Yokosuka, Japan

[73] Assignee: Nissan Motor Company, Limited, Yokohama, Japan

[21] Appl. No.: 147,608

[22] Filed: May 7, 1980

[30] Foreign Application Priority Data

May 11, 1979 [JP] Japan .................................... 54-56962

[51] Int. Cl.³ ........................ G01F 25/00; G01F 1/32; G01F 1/68
[52] U.S. Cl. ........................................... 73/3; 73/204; 73/861.22
[58] Field of Search ........... 73/861.22, 861.23, 861.24, 73/204, 3

[56] References Cited

U.S. PATENT DOCUMENTS

| | | | |
|---|---|---|---|
| 2,813,424 | 11/1957 | Liepmann | 73/861.24 |
| 3,693,438 | 9/1972 | Yamasaki | 73/861.22 |
| 3,975,951 | 8/1976 | Kohama | 73/204 |
| 3,995,482 | 12/1976 | Kissel | |
| 4,142,407 | 3/1979 | Kuroiwa et al. | |
| 4,264,961 | 4/1981 | Nishimura | 73/3 |

*Primary Examiner*—S. Clement Swisher
*Attorney, Agent, or Firm*—Schwartz, Jeffery, Schwaab, Mack, Blumenthal & Koch

[57] ABSTRACT

Apparatus for measuring the velocity of the rate of flow of a flowing fluid, comprising a vortex-generating element disposed in a flow tube to create a Karman vortex street in the fluid flow, a hot wire element disposed in the flow tube, transducer means for producing first flow rate signal based on the frequency of shedding of Karman vortices from the vortex-generating element and second flow rate signal based on the cooling effect of the flowing fluid on the hot wire element and signal selection means for selectively putting out the first signal under steady flow conditions and the second signal under pulsating flow conditions. Preferably the hot wire element is made to serve also as the probe element for detection of the vortex generation frequency, and the first signal under steady flow conditions is utilized also to calibrate the second signal.

11 Claims, 6 Drawing Figures

FLOW RATE MEASURING APPARATUS HAVING VORTEX-GENERATING ELEMENT AND HOT WIRE ELEMENT

BACKGROUND OF THE INVENTION

This invention relates to an apparatus for measuring the velocity or the rate of flow of a flowing fluid.

It is known that the velocity of a fluid flow and accordingly the rate of flow of a fluid through a conduit can be measured by disposing an elongate vortex-generating body, for example a cylindrical body, in a fluid flow and detecting the frequency of periodic generation of Karman vortices attributed to the existence of this body in the flow since the frequency is proportional to the flow velocity and, hence, to the rate of flow. A flowmeter or a flow-velocity detector on this principle is advantageous particularly in that the apparatus does not undergo changes in its velocity-detecting characteristic even with the passage of time because the relationship between the flow velocity and the vortex-generation frequency is determined solely by the thickness of the vortex-generating body (diameter in the case of a cylinder) and that the apparatus can provide a pulse signal indicative of the detected flow velocity or flow rate and accordingly facilitates digital processing of the obtained data.

However, flowmeters of this type have a disadvantage that in a pulsative flow the measurement of the flow velocity or flow rate becomes difficult primarily because stable generation of Karman vortices cannot be expected under pulsating flow conditions. In the case of using a flowmeter of this type in measuring the rate of flow of air drawn into an internal combustion engine by way of example, the accuracy of measurement cannot be guaranteed under full-throttle and nearly full-throttle conditions because of the tendency of Karman vortices being generated in synchronization with pulsation of the sucked air and/or because of a significant disturbance of the output signal by the influence of a pulsative flow of the air.

A flowmeter of the hot wire type, an example of other types of known apparatus for measuring the velocity or flow rate of fluids, comprises an electrical resistance heating wire element stretched in a fluid flow with application of a heating current thereto to detect the flow velocity by measuring the cooling effect of the flowing fluid on the heated wire element or the amount of heat the wire element is deprived of per unit time. This flowmeter is advantageous particularly in its capability of conducting measurements over a very wide range of flow velocities and invariableness of its performance even in a pulsative flow. However, this device undergoes considerable changes in its velocity-detecting characteristic with the passage of time because the heat radiation characteristic of the heated wire varies as the wire is gradually contaminated during use.

SUMMARY OF THE INVENTION

It is an object of the present invention to provide an apparatus for measuring the velocity or the rate of flow of a flowing fluid, which apparatus makes it possible to accomplish sufficiently high precision, high stability and wide range measurement almost irrespective of flow conditions of the fluid flow subjected to measurement.

It is another object of the invention to provide a flow velocity or flow rate measuring apparatus which has not only the merits of a Karman vortex type flowmeter but also the merits of a hot wire type flowmeter and, moreover, is fully practicable even in a pulsative flow and even after long use in a contaminating fluid.

It is a still another object of the invention to provide a flow rate measuring apparatus which is suitable for measurement of the rate of flow of air in an induction passage of an internal combustion engine.

A flow velocity or flow rate measuring apparatus according to the present invention is made to function both as a flowmeter of the Karman vortex type and as a flow meter of the hot wire type and includes output signal selection means for selectively putting out a flow rate (or flow velocity) signal produced by the function as a Karman vortex type flowmeter or another flow rate (or flow velocity) signal produced by the function as a hot wire type flowmeter depending on flow conditions of the flowing fluid subjected to measurement. That is, the former flow rate signal is utilized when the fluid flow is not pulsating and the latter flow rate signal when the fluid flow is pulsating.

More specifically, an apparatus according to the invention comprises an elongate vortex-generating body disposed in a conduit through which flows a fluid transversely across the conduit to create a Karman vortex street in the flowing fluid, at least one electrically heatable wire stretched in the conduit, first transducer means for detecting the frequency of shedding of Karman vortices from the vortex-generating body and producing a first flow rate signal based on the detected frequency, second transducer means for detecting a cooling effect of the flowing fluid on the wire while the wire is electrically heated and producing a second flow rate signal based on the detected cooling effect, and output signal selection means for selectively putting out one of the first and second flow rate signals depending on flow conditions in the conduit such that the first flow rate signal is put out while the fluid is flowing under predetermined flow conditions where generation of Karman vortices by the vortex-generating body occurs stably but the second flow rate signal when the fluid is not flowing under the predetermined flow conditions.

It is possible and preferable that the hot wire element in the apparatus according to the invention is made to serve also as a probe element of the first transducer means for detection of Karman vortices. In this case, preferably the apparatus is constructed as follows. The hot wire element is constituted of two resistance heating wires which are stretched downstream of and generally parallel to the elongate vortex-generating body and spaced from each other such that the two rows of vortices of a Karman vortex street pass over the two wires, respectively, and a current control circuit supplies a controlled heating current to the two wires so as to maintain a mean temperature of the two wires constant. The first transducer means are constructed so as to detect the frequency of shedding of Karman vortices from the vortex-generating body by detecting a difference between a terminal voltage developed across one of the two wires and a terminal voltage developed across the other wire. The second transducer means are constructed to produce a signal representative of a mean flow velocity through the conduit by first multiplying the heating current by a total resistance of the two wires and then making the fourth power of the voltage given by the first step.

It is also preferable that a flow rate measuring apparatus according to the invention is made to comprise a calibration circuit for calibrating the second flow rate signal (produced by the function of the apparatus as a hot wire type flowmeter) while the fluid is not pulsating, that is, while the signal selection means put out the first flow rate signal (produced by the function of the same apparatus as a Karman vortex type flowmeter), by utilizing the first flow rate signal as a reference signal. By this technique, the second flow rate signal (which is utilized as the output signal of the apparatus when the fluid flow is pulsating) becomes to have sufficient accuracy even if the heating wires have been contaminated.

Thus the present invention makes it possible to accomplish high accuracy and high stability measurements of flow velocities or flow rates not only under steady flow conditions but also under pulsating flow conditions, and such measurements can be done over a wide range of flow velocity or flow rate practically without suffering from changes in the performance of the apparatus with the passage of time.

DESCRIPTION OF THE PREFERRED EMBODIMENTS

Figure 1:
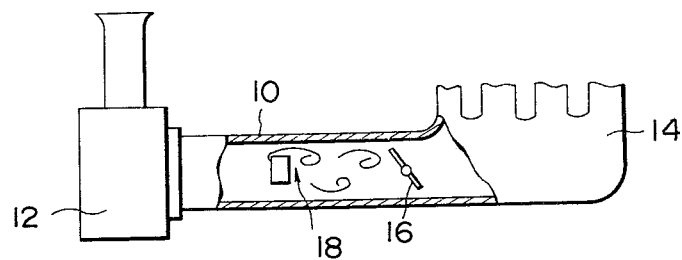
FIG. 1 is a schematic and partly sectional view of an induction pipe of an internal combustion engine, showing the disposition of a probe unit in the induction pipe to measure the flow rate of air drawn into the engine by using the present invention.

By way of example, the present invention is embodied in an apparatus for measuring the rate of flow of air in an induction pipe of an internal combustion engine. In FIG. 1, indicated at 10 is an induction pipe extending from an air cleaner 12 to an intake manifold 14 of an internal combustion engine which may be an automotive engine. Upstream of a usual throttle valve 16, a probe unit 18 of a flow rate measuring apparatus according to the invention is fixedly disposed in the induction pipe 10.

Figure 2:
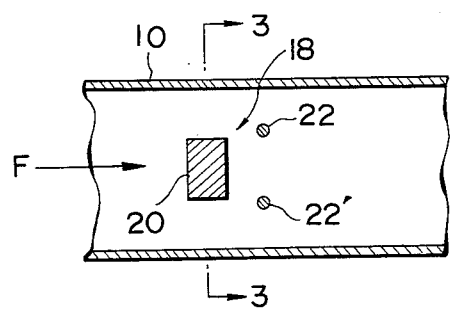
FIG. 2 is a partial enlargement of FIG. 1 to show the particulars of the probe unit.
Figure 3:
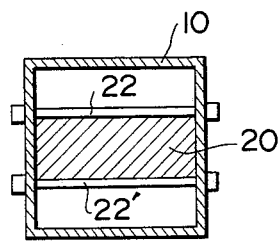
FIG. 3 is a sectional view taken along the line 3—3 of FIG. 2.

As shown in FIGS. 2 and 3, the probe unit 18 is constituted of a vortex-generating element 20 and a pair of electrical resistance heating wires 22 and 22'. The vortex-generating element 20 is usually an elongate member suitable for shedding of a Karman vortex street therefrom and in this example takes the form of a rectangular prism which is secured in the induction pipe 10 transversely of the air passageway defined in this pipe 10 such that the longitudinal axis of the prism 20 extends substantially perpendicularly to the direction of the flow of air, indicated by the arrow F, through the pipe 10. In cross section, the vortex-generating member 20 is small enough to leave a sufficiently wide space between the inner surface of the pipe 10 and either of the upper and lower sides (on the drawing) of this member 20. The shape of the vortex-generating member 20 is arbitrary insofar as the member 20 is effective for generation of Karman vortices. Other than the illustrated rectangular prism, the vortex-generating member 20 may take the form of a cylinder, a triangular prism or a still different polygonal prism. This member 20 may be made of either a metal or a nonmetallic material.

The electrical resistance heating wires 22 and 22' are thin wires of, for example, platinum, nickel or tungsten. The wires 22, 22' are located at a section downstream of the vortex-generating member 20 and stretched transversely of the fluid passageway so as to lie parallel to the elongate vortex-generating member 20 and symmetrically with respect to a plane which is parallel to the flow direction F and contains the longitudinal axis of the vortex-generating member 20. The distances of the wires 22, 22' from the vortex-generating member 20 and from the aforementioned plane can arbitrarily be determined conditioning only that the wires 22, 22' are located in regions where changes occur in the velocity of the fluid flow when Karman vortices are shed from the vortex-generating member 20. However, it is preferable that each of the wires 22, 22' is located in a region through which passes each row of Karman vortices and especially in a plane containing a line on which moves the center of each vortex. In the illustrated embodiment, the wires 22, 22' are stretched over the entire width of the flow tube, in this case the induction pipe 10. However, also it is possible to employ shorter wires by providing suitable supports in the pipe 10 and stretching each of the shorter wires between two supports so as to lie right downstream of a lengthwise middle part of the elongate vortex-generating member 20. In the case of a flow tube having a relatively large cross-sectional area, the use of supports to stretch relatively short wires is advantageous from the viewpoint of mechanical strength of the stretched wires.

During measurement operation, the wires 22, 22' are kept heated by application of an electric current thereto.

Figure 4:
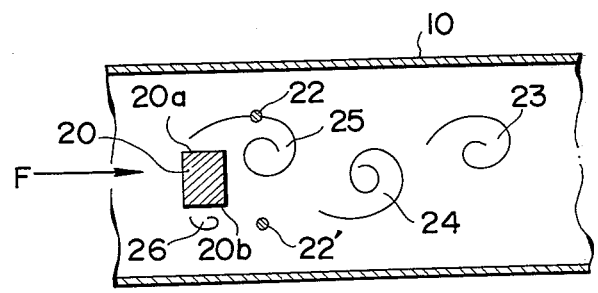
FIG. 4 is a view similar to FIG. 2 and explanatorily illustrates periodic generation of Karman vortices in the flow of air through the pipe.

As illustrated in FIG. 4, a double row of Karman vortices are shed alternately from two sides 20a and 20b of the vortex-generating member 20, that is, vortex 23 is shed from the upper side 20a, next vortex 24 from the lower side 20b, the vortex 25 from the side 20a, and vortex 26 from the side 20b. At the section of the wire 22 in this illustration, the direction of rotation of the vortex 25 is generally similar to the direction F of the fluid flow, but at the section of the other wire 22' the direction of rotation of the same vortex 25 is generally reverse to the flow direction F. Therefore, this vortex 25 causes the fluid flow to have an increased local velocity at the location of the wire 22 and a decreased local velocity at the location of the other wire 22'. Contrarily, the next vortex 26 will cause the fluid flow to have a decreased local velocity at the location of the wire 22 and an increased local velocity at the location of the wire 22'. This means that the flow velocity exhibits periodic and alternate increases and decreases at the location of either of these two wires 22,22'. Therefore, the cooling effect of the flowing fluid on each of the heated wires 22,22' exhibits periodic and alternate enhancement and lowering in synchronization with the generation of Karman vortices. However, even while there is a difference in local flow velocity between the location of the wire 22 and the location of the other wire 22', the mean value of the two different local flow velocities becomes nearly equal to a mean velocity of the fluid flow through the entire sectional area of the fluid passageway defined in the pipe 10.

Figure 5:
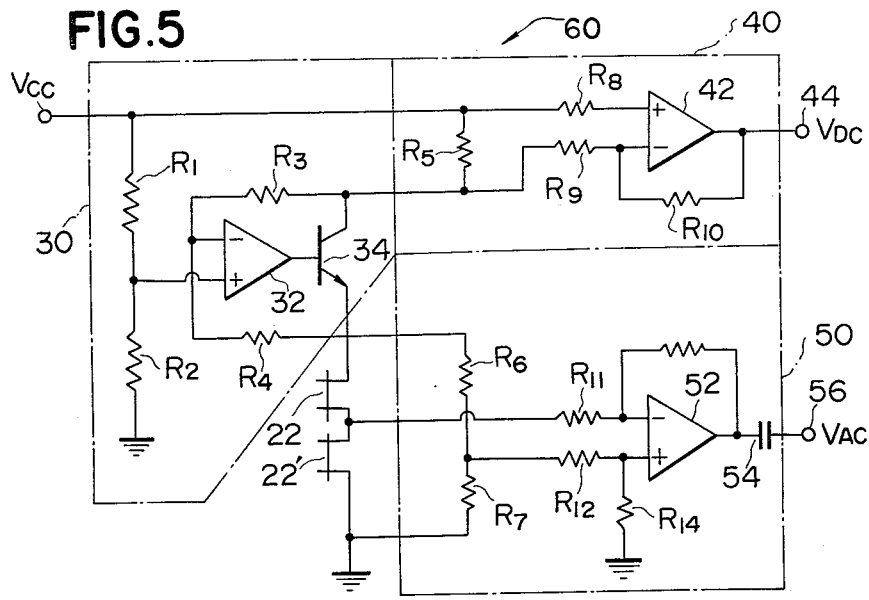
FIG. 5 is a circuit diagram showing a principal part of the electrical components of a flow rate measuring apparatus as an embodiment of the invention.

A flow rate measuring apparatus according to the invention comprises electrical circuits to accomplish controlled heating of the wires 22,22' and produce electrical signals representative of flow velocities or flow rates. FIG. 5 shows an exemplary construction of such circuits. A combined circuit 60 of FIG. 5 consists of a heating-current control circuit 30, mean flow velocity detection circuit 40 and flow velocity fluctuation detection circuit 50. Symbol $V_{cc}$ represents a source voltage to operate the circuits 60.

The two resistance heating wires 22,22' are connected in series, and the control circuit 30 is made to have the function of controlling the intensity of a heating current supplied to the series-connected wires 22,22' such that the total resistance of these two wires 22,22' is maintained constant. This circuit 30 has an operational amplifier 32 of which output terminal is connected to the base of a transistor 34 through which a heating current is supplied to the wires 22,22'. A constant voltage obtained by dividing the source voltage $V_{cc}$ by a voltage divider constituted of two resistors $R_1$ and $R_2$ is applied to the positive input terminal of the operational amplifier 32, and another voltage obtained by dividing the source voltage $V_{cc}$ by the sum of the resistances of three resistors $R_5$, $R_3$ and $R_4$ and two heating wires 22,22' is applied to the negative input terminal of the same amplifier 32. The operational amplifier 32 functions to regulate the intensity of the heating current such that the total resistance of the two heated wires 22,22' becomes contant with the result that the difference between the two input voltage applied to the operational amplifier 32 becomes zero.

The mean velocity detection circuit 40 is constructed so as to measure a mean velocity of the fluid flow in the pipe 10 by utilizing the sum of the resistances of the two heated wires 22,22'. In general, the relationship between a flow velocity Q and a heating current i needed to maintain a resistance heating wire disposed in a fluid flow at a constant temperature is expressed by $i^2 \cdot r \propto Qv$, where r is the resistance of the wire. Accordingly the flow velocity Q can be known from the fourth power of a current intensity needed to accomplish the constant temperature heating of the wire, i.e. $Q \propto i^4$. In the case of using the probe unit 18 of FIGS. 2 and 3 where the heating wires 22,22' are located near the vortex-generating member 20, local flow velocities in two regions respectively containing the two wires 22 and 22' involve an axial flow velocity component of each Karman vortex and therefore respectively exhibit fluctuations. However, since the row of Karman vortices 23, 25, etc. are distributed unsymmetrically with respect to the plane of symmetry for the two wires 22,22', it is possible to detect a mean velocity of the flow through the pipe 10 by averaging the fluctuations of local flow velocities at the locations of the two wires 22,22', that is, by utilizing the sum of the resistances of the two wires 22,22'. The intensity of the heating current supplied to the wires 22,22' can be measured by utilizing a voltage difference across the fixed resistor $R_5$ in the circuit 40. This voltage difference is put into an operational amplifier 42, which functions such that an output voltage $V_{DC}$ at output terminal 44 of this operational amplifier 42 is representative of the mean flow velocity Q in the relationship of $V_{DC} \propto Q^{\frac{1}{4}}$.

The flow velocity fluctuation detection circuit is constructed so as to examine the difference between a terminal voltage across the heating wire 22 and another terminal voltage across the other wire 22'. Although a heating current to the wires 22,22' is controlled so as to maintain a mean temperature of these two wires 22,22' constant, the temperatures and hence resistances of the respective wires 22 and 22' undergo periodic changes according as Karman vortices pass over the respective wires 22,22'. Therefore, an AC signal which is in synchronization with the frequency of generation of Karman vortices can be produced by continuously detecting the aforementioned difference between the respective terminal voltages of the two wires 22,22'. By detecting this voltage difference the magnitudes of fluctuations (AC component) of the resistances of the respective wires 22,22' can be detected always at a constant level (deviation value) even though the middle value of a fluctuating terminal voltage across each wire 22 or 22' varies according to changes in the flow conditions. Therefore, the frequency of the resistance changes can accurately be detected by making comparison of the magnitudes of the resistance fluctuations at a constant level. Naturally the frequency f of the aforementioned AC signal has a proportional relationship with the mean flow velocity Q: $f \propto Q$.

The flow velocity fluctuation detection circuit 50 of FIG. 5 is an example of circuits for producing an AC signal $V_{AC}$ of the above explained frequency f. Two series-connected resistors $R_6$ and $R_7$ having the same resistance which is greater than the respective resistances of the two wires 22,22' are connected with the two wires 22,22' so as to construct a bridge circuit. The intermediate junction between the two wires 22 and 22' is connected to one of the two input terminals of an operational amplifier 52 via an input resistor $R_{11}$, and the intermediate junction between the two resistors $R_6$ and $R_7$ is connected to the other input terminal of the same operational amplifier 52 via an input resistor $R_{12}$. A capacitor 54 is interposed between the output terminal of the operational amplifier 52 and output terminal 56 of this circuit 50 to cut off a DC component of the output of the operational amplifier 52. By this construction, an output signal appearing at the output terminal 56 becomes the AC signal $V_{AC}$ of which frequency f is proportional to the mean flow velocity Q.

In the case of using the wires 22,22' as the probe element of a flowmeter of the hot wire type by combining them with the circuits 30 and 40, there i a disadvantage that the flowmeter always needs calibration because errors in measurements increase with the passage of time by reason of contamination of the wires 22,22' and resulting changes in the heat radiation characteristic of the wires 22,22'.

In contrast, when the probe unit 18 of FIG. 2 is utilized as part of a flowmeter of the Karman vortex type the passage of time does not cause any changes in the performance characteristics of the probe unit 18. Therefore, in the apparatus according to the invention it becomes possible to maintain accuracy in the function of this probe unit 18 as part of a hot wire type flowmeter by performing calibration of the output values of the hot wire type flowmeter by utilizing the mean flow velocity signal produced by the Karman vortex type flowmeter (constituted by the probe unit 18, circuit 30 and the circuit 50) either continuously or under constant flow conditions. However, when the fluid subjected to measurement is significantly pulsating as frequently experienced in the measurement of the flow rate of air drawn into an internal combustion engine, a Karman vortex type flowmeter suffers significant degradation in its accuracy by reason that the generation of Karman vortices becomes very irregular, whereas a hot wire type flowmeter is not adversely influenced by pulsation of the fluid flow and can accomplish measurement of a mean flow velocity in the flow tube, exactly detecting the pulsations, with good accuracy and stability.

Therefore, in preferred embodiments of the invention the resistance heating wires arranged to detect Karman vortices are made to serve also as the probe element of a hot wire type flowmeter, and the electric circuits are constructed so as to put out a flow velocity signal by utilizing the results of measurement accomplished by the function of the apparatus as a Karman vortex type flowmeter under flow conditions where pulsation of the fluid flow is not significant and hence this mode of function of the apparatus has high accuracy, at the same time performing calibration of the results of measurement made by the function of the same apparatus as a hot wire type flowmeter by utilizing the flow velocity data obtained by detecting Karman vortices, but, under other flow conditions where pulsation of the fluid flow is too significant to guarantee accurate function of a Karman vortex type flowmeter, another form of flow velocity signal by utilizing the results of measurement made by the function of the apparatus as a hot wire type flowmeter.

Figure 6:
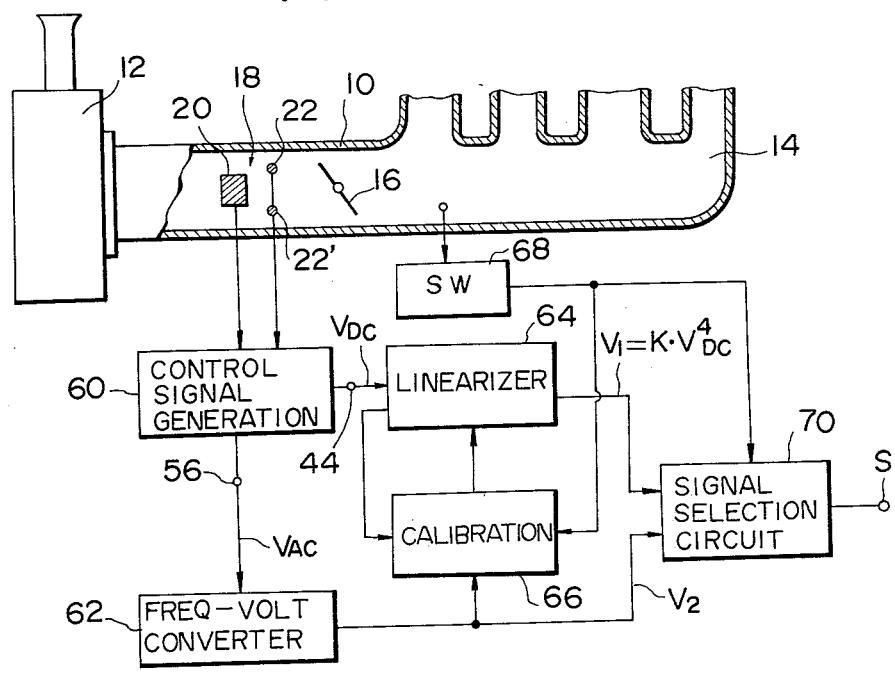
FIG. 6 shows in block form a complete construction of an air flow rate measuring apparatus which embodies the invention and is applied to the induction pipe of FIG. 1.

An embodiment of such concept is shown in FIG. 6, wherein box 60 represents the entirety of three circuits 30, 40 and 50 of FIG. 5.

As explained with reference to FIG. 5, the circuit 60 has an output terminal 44 to put out the voltage signal $V_{DC}$ produced by the function of the apparatus as a hot wire type flowmeter and another output terminal 56 to put out the AC signal $V_{AC}$ produced by the function of the apparatus as a Karman vortex type flowmeter. The output terminal 56 is connected to a frequency-voltage converter 62 wherein the frequency f of the AC signal $V_{AC}$ is converted into a voltage signal $V_2$. The output terminal 44 is connected to a linearizer 64 which has the function of making the fourth power of the voltage signal $V_{AC}$ to produce an output signal $V_1$ which is proportional to $V_{DC}^4$, that is, $V_1 = K \cdot V_{DC}^4$, where K is a proportional constant. A calibration circuit 66 is linked with the linearizer 64 and the frequency-voltage converter 62 to perform calibration of the output $V_1$ of the linearizer 64, that is, calibration of the signal $V_{DC}$ produced by the hot wire type flowmeter incorporated in the apparatus of FIG. 6. This circuit 66 makes a comparison between the output $V_1$ of the linearizer 64 and the output $V_2$ of the converter 62, using the latter output $V_2$ as the reference, and always regulates the proportional constant K to a proper value which is returned to and utilized in the linearizer 64.

The output terminals of the linearizer 64 and the frequency-voltage converter 62 are connected to a signal selection circuit 70 which is under the control of a switching device 68 to selectively put out one of the above explained two signals $V_1$ and $V_2$. The switching device 68 is a vacuum-responsive device arranged so as to sense the magnitude of intake vacuum in the induction pipe 10 thereby to estimate the flow condition of air in the pipe 10. The calibration circuit 66 too is governed by this switching device 68. While the magnitude of intake vacuum in the induction pipe 10 is greater than a predetermined level, meaning that the flow of air through the pipe 10 makes little pulsation, the switching device 68 takes a first state to allow the calibration circuit 66 to continue the above described calibration operation and command the signal selection circuit 70 to selectively put out the signal $V_2$, which is produced by the function of the apparatus of FIGS. 5 and 6 as a Karman vortex type flowmeter, as a real output signal S of this flow rate measuring apparatus. When the magnitude of the intake vacuum is below the predetermined level, the switching device 68 takes a second state to interrupt the function of the calibration circuit 66 and cause the selection circuit 70 to selectively put out the signal $V_1$ ($=K \cdot V_{DC}^4$), which is produced by the hot wire type flowmeter incorporated in this apparatus, as the output signal S. In this state, the proportional constant K takes a value determined by the calibration circuit 66 just before interruption of the calibration function.

So long as the air flow through the induction pipe 10 does not make significant pulsation, the accurateness of the signal $V_2$ (employed as the flow rate signal S) based on the frequency of generation of Karman vortices is guaranteed, and the use of this signal $V_2$ for calibration and correction of the signal $V_1$ based on the cooling effect of the flowing air on the heated wires 22,22' results in that the signal $V_1$ (which becomes the output signal S while the air flow in the pipe 10 tends to make significant pulsation) serves as a sufficiently accurate indication of the air flow rate even if the wires 22,22' have been contaminated. Thus, the flow rate measuring apparatus of FIGS. 5 and 6 allows to continue high precision and high stability measurement of the quantity of air drawn into the engine under every range of the engine operating conditions.

The switching device 68 has been described as to make a switching action depending on the magnitude of intake vacuum, but this should not be taken as limitative. In place of the described vacuum-responsive switching device 68, use may be made of a different type of switching device which is responsive to a certain parameter of the engine operating conditions other than the magnitude of intake vacuum, such as the degree of opening of the throttle valve or pulse duration of a fuel injection control signal. In the case of utilizing the degree of opening of the throttle valve by way of example, a switching device alternative to the device 68 in FIG. 6 will be made such that the signal selection circuit 70 selectively puts out the signal $V_2$ while the degree of opening of the throttle valve is smaller than a predetermined value, with the maintenance of the function of the calibration circuit 66, but, instead, the signal $V_1$ when the throttle valve opening degree is greater than the predetermined value.

What is claimed is:

1. An apparatus for measurement of the velocity or the rate of flow of a fluid flowing through a conduit, comprising:
   an elongate vortex-generating body disposed in the conduit transversely across the conduit to create a Karman vortex street in the flowing fluid;
   at least one electrically heatable wire stretched in the conduit;
   first transducer means for detecting the frequency of shedding of Karman vortices from said vortex-generating body and producing a first flow rate signal based on the detected frequency;

second transducer means for detecting a cooling effect of the flowing fluid on said at least one wire while said at least one wire is electrically heated and producing a second flow rate signal based on the detected cooling effect; and output signal selection means for selectively putting out one of said first and second signals as an output signal of the apparatus depending on flow conditions in the conduit such that said first signal is put out while the fluid is flowing under predetermined flow conditions where generation of Karman vortices by said vortex-generating body occurs stably but said second signal is put out when the fluid is not flowing under said predetermined flow conditions.

2. An apparatus according to claim 1, wherein said at least one electrically heatable wire is disposed downstream of said vortex-generating body so as to serve also as a vortex-detecting probe element of said first transducer means.

3. An apparatus according to claim 1, wherein said at least one electrically heatable wire consists of two wires which are spaced from each other, located downstream of said vortex-generating body and stretched so as to lie generally parallel to said vortex-generating body and generally symmetrically with respect to a plane which is parallel to the direction of the fluid flow and contains the longitudinal axis of said vortex-generating body, said first transducer means comprising an electric circuit for supplying a controlled heating current to said two wires so as to maintain a mean temperature of said two wires constant and detecting the difference between a terminal voltage developed across one of said two wires and another terminal voltage developed across the other of said two wires thereby to produce an AC signal representative of the frequency of shedding of Karman vortices from said vortex-generating body.

4. An apparatus according to claim 3, wherein said second transducer means comprise an electric circuit for producing a DC voltage signal representative of a mean velocity of the fluid flow based on the intensity of said heating current.

5. An apparatus according to claim 4, wherein said second transducer means further comprise an electric circuit for producing a signal which serves as said second flow rate signal and is proportional to the fourth power of said voltage signal.

6. An apparatus according to claims 1 or 2, further comprising calibration means for calibrating predetermined one of said first and second flow rate signals while said signal selection means put out the other of said first and second flow rate signals by utilizing the other of said first and second flow rate signals as a reference signal.

7. An apparatus according to claims 1 or 2, further comprising calibration means for calibrating said second flow rate signal while said signal selection means put out said first flow rate signal by utilizing said first flow rate signal as a reference signal.

8. An apparatus according to claim 7, wherein said calibration means have the function of interrupting the calibration operation thereof when said signal selection means put out said second flow rate signal and retaining a corrective coefficient determined by calibrating operation thereof just before interruption of the calibrating operation.

9. An apparatus according to claims 1 or 2, wherein said signal selection means comprise a switching means for detecting flow conditions in the conduit by detecting the magnitude of pressure in the conduit.

10. An apparatus for measurement of the velocity or the rate of flow of a fluid flowing through a conduit, comprising:

an elongate vortex-generating body disposed in the conduit transversely across the conduit to create a Karman vortex street in the flowing fluid;

two electrically heatable wires which are spaced from each other, electrically connected in series, disposed in the conduit near and downstream of said vortex-generating body and stretched so as to lie generally parallel to said vortex-generating body and generally symmetrically with respect to a plane which is parallel to the direction of the fluid flow and contains the longitudinal axis of said vortex-generating body;

current control means for supplying a controlled heating current to said two wires so as to maintain a mean temperature of said two wires constant;

first signal-producing means for producing an AC voltage signal representative of the frequency of shedding Karman vortices from said vortex-generating body based on the difference between a terminal voltage developed across one of said two wires and another terminal voltage developed across the other of said two wires and producing a first flow rate signal by utilizing said AC signal;

second signal-producing means for producing a second flow rate signal which is representative of a cooling effect of the flowing fluid on said two wires while said two wires are electrically heated and is proportional to the fourth power of a DC voltage signal representative of a mean velocity of a fluid flow based on the intensity of said heating current;

output signal selection means for selectively putting out one of said first and second flow rate signals; and switching means for detecting flow conditions in the conduit and commanding said signal selection means to put out said first flow rate signal while the fluid is flowing under predetermined flow conditions where the flowing fluid makes little pulsation so that generation of Karman vortices by said vortex-generating body occurs stably but said second flow rate signal when said fluid is flowing under different flow conditions where the flowing fluid tends to make a significant pulsation.

11. An apparatus according to claim 10, further comprising calibration means for calibrating said second flow rate signal while said signal selection means put out said first flow rate signal by utilizing said first flow rate signal as a reference signal thereby determining a proper value of a proportional constant component of said second flow rate signal, interrupting the calibration operation thereof when said switching means command said signal selection means to put out said second flow rate signal and, during interruption of the calibrating operation thereof, retaining a proper value of said proportional constant component determined just before interruption of the calibration operation.

* * * * *